United States Patent [19]

Hilbert et al.

[11] 4,249,805
[45] Feb. 10, 1981

[54] COMPOSITE PHOTOGRAPHY SYSTEM

[75] Inventors: Robert S. Hilbert, La Canada; Darryl E. Gustafson, Altadena; Thomas I. Harris, Pasadena; Matthew P. Rimmer, Claremont, all of Calif.

[73] Assignee: Magicam, Inc., Hollywood, Calif.

[21] Appl. No.: 23,591

[22] Filed: Mar. 26, 1979

[51] Int. Cl.³ ............................................... G03B 21/32
[52] U.S. Cl. ........................................ 352/85; 352/46; 350/415
[58] Field of Search ........................ 352/87, 85, 46, 70; 350/175 TS, 46, 47

[56] References Cited

U.S. PATENT DOCUMENTS

| | | | |
|---|---|---|---|
| 2,380,210 | 7/1945 | Bennett | 350/175 TS |
| 2,600,805 | 6/1952 | Reiss | 350/175 TS |
| 3,401,233 | 9/1968 | Hellings | 350/47 |
| 3,902,798 | 9/1975 | Trumbull | 352/85 |
| 4,083,057 | 4/1978 | Quinn | |

OTHER PUBLICATIONS

"Telecentric Imagery by Means of Optical Systems for Measuring Apparatus", *Microtechnic, vol. XI, No. 5, pp. 216-222.*

Primary Examiner—Monroe H. Hayes
Attorney, Agent, or Firm—Jackson, Jones & Price

[57] ABSTRACT

A composite photography system of a registered matte type having foreground and background camera optical systems is provided. The respective images from each camera optical system are maintained in registration whereby objects in the background scene can be viewed by one camera and objects in a foreground scene can be viewed by the other camera to produce a realistic composite image. The optical systems permit the maintenance of a substantially constant magnification ratio of image to object during a variable focussing of at least one of the foreground and background optical systems. Additionally, substantially stationary entrance pupil positions are maintained during the focussing mode of operation. The background lens system is, by itself particularly adapted for incorporation into optical scanning probes such as simulators to provide a minimum altitude and constant image magnification during focussing.

54 Claims, 25 Drawing Figures

U.S. Patent  Feb. 10, 1981  Sheet 1 of 7  4,249,805
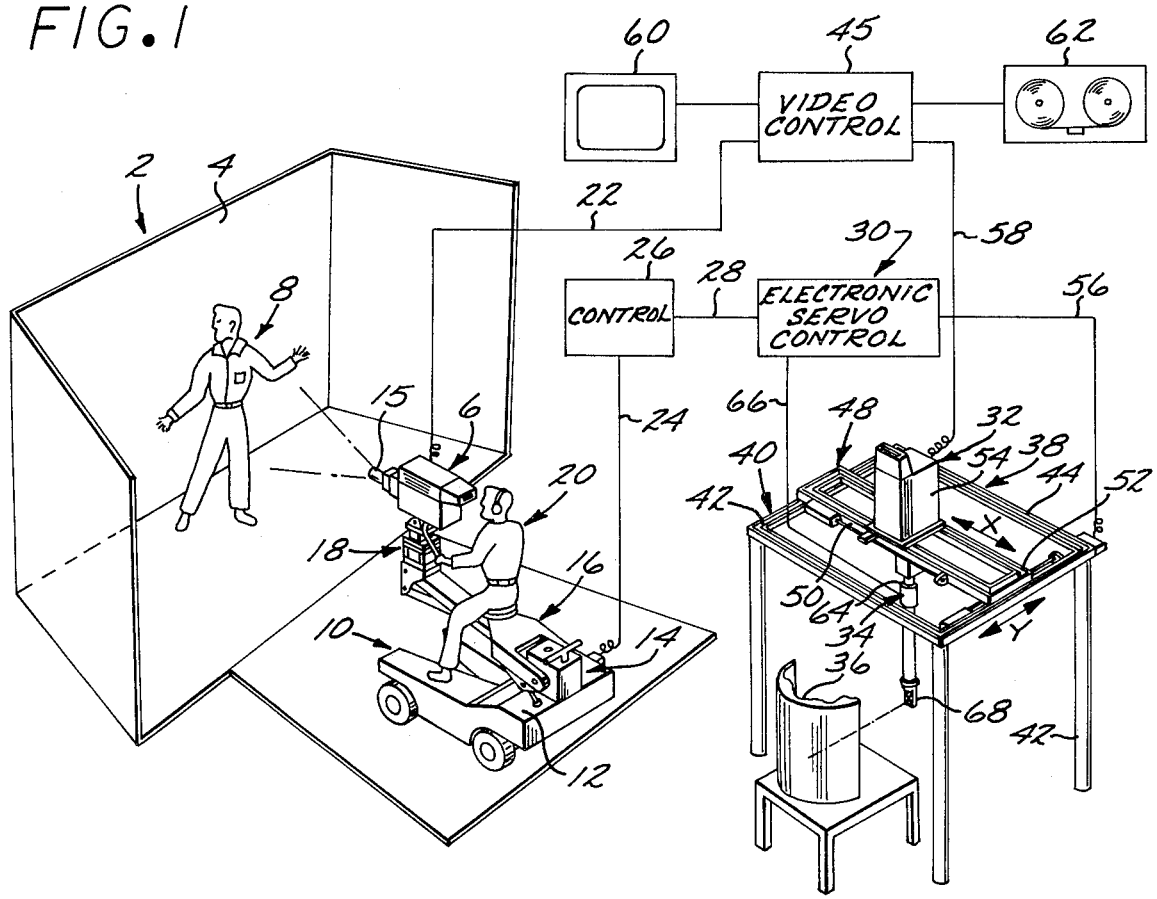
FIG.1
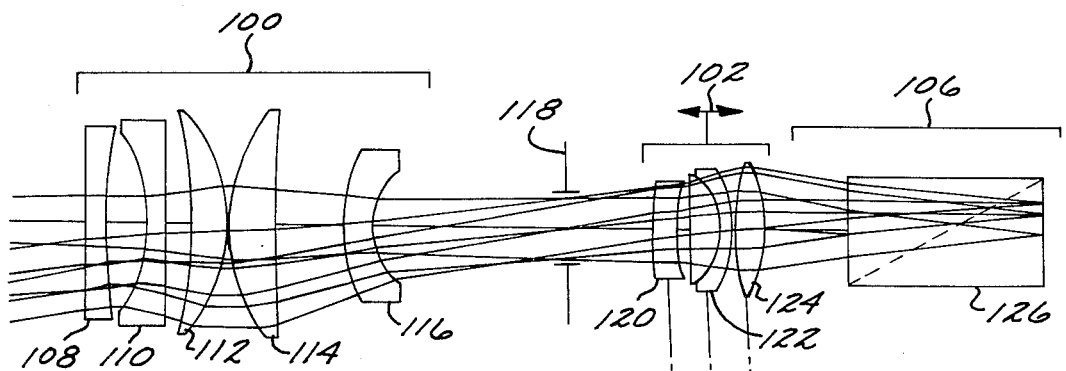
FIG.2
FIG.3

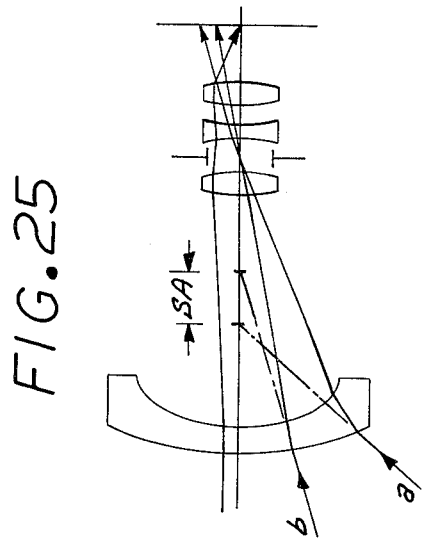
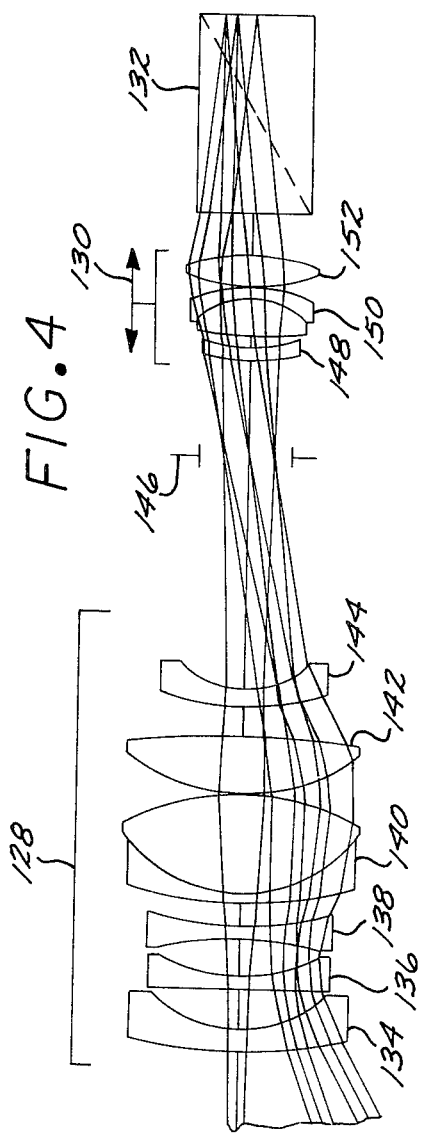

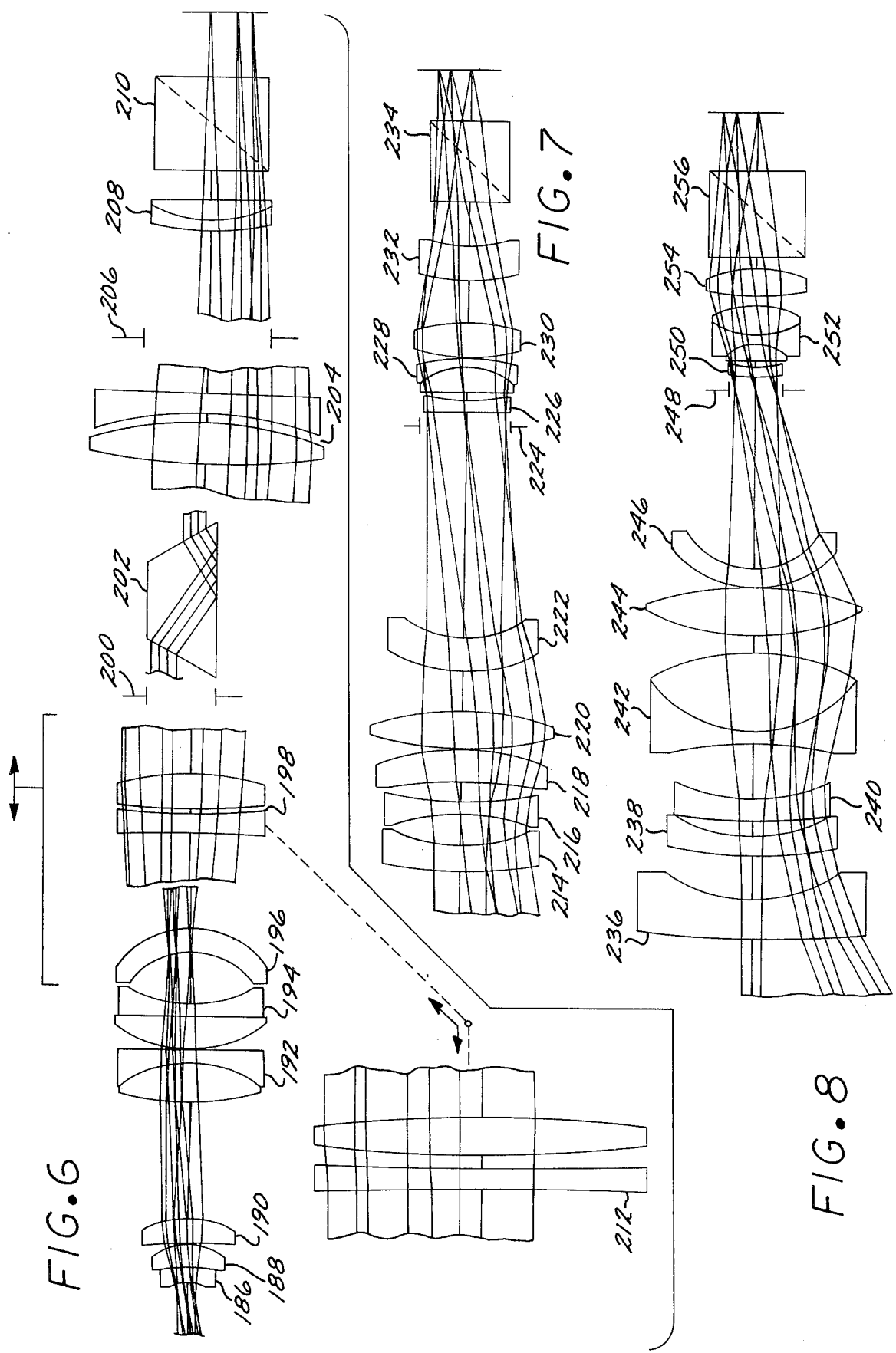

COMPOSITE PHOTOGRAPHY SYSTEM

BACKGROUND OF THE INVENTION

1. Field of the Invention

The present invention relates to improvements in composite photography systems of the type in which different scenes are photographed by separate cameras and are combined to synthesize realistic images. More particularly, the present invention relates to improved foreground and background optical systems requiring variable focussing capability and panning while having correlated optical features that permit a scaling of the background scene to that of foreground action while maintaining registration, constant magnification ratios, dual field of view and minimal distortion and aberration. Finally, the present invention includes a unique background optical system that can be incorporated into optical scanning probes such as simulators.

2. Description of the Prior Art

The combining of a foreground scene which typically includes moving objects such as actors with a background scene to produce a composite picture is known in the prior art. The combining of two images is accomplished by a process wherein the portions of the background scene corresponding to the foreground objects are blanked out or masked by a foreground camera. In film cameras, the masking is accomplished by making an opaque matte of the foreground objects and printing the background scene masked by the matte. The foreground objects are then printed on the masked areas of the background to form the composite picture. When the system is used in cinematography, the cameras may be either film or television. Because the masking matte moves or travels from frame to frame, such a system has come to be referred to in the art as a travelling matte system.

A number of problems exist in accomplishing the goal of accurate registration and composite image quality during relative movement of each camera and the objects in the respective scenes. For example, unless registration is maintained, the desired illusion is lost. As can readily be appreciated, the required degree of accuracy in registration depends upon the intended use of the finished composite picture. Thus, the projection magnification required for widescreen picture projection, for example, requires much more accurate registration than a video format.

Only recently, composite image systems, such as travelling matte systems, have provided the capability of synchronized movement of the cameras relative to their respective frames of reference, including their viewed scenes. The system described in the Slater U.S. Pat. No. 3,914,540 and in the Trumbull et al., U.S. Pat. No. 3,902,798, describes a composite image system which has the capability of synchronizing the background camera movements with the foreground camera movements and the x, y, z, yaw and pitch axes so that a cameraman can "dolly," "crab" or "pedestal" as ordered by the director in the foreground camera in these five axes. A relatively precise camera control servo mechanism controlled by a computer, has been developed to maintain appropriate perspective matching during complex camera movements. For a complete description of such a system, reference should be made to these two patents and they are accordingly incorporated herein by reference as if fully set forth at this point. Additional information can be found in "Magicam-Process and Production Techniques" by Joseph Matza, et al. SMPTE Journal, October 1977, Volume 86 page 728.

As explained in the above patents, the objects viewed by the perspective of the two cameras usually differ in scale or relative size. The scene viewed by the background camera typically is a miniaturized set while the scene viewed by the foreground camera typically would be a life-size actor or object. Combining a life-size actor with a miniature background set, according to the travelling matte technique, will cause the fullsize actors to appear to be in a lifelike environment of the miniaturized set. Because the scene viewed by the background camera is miniaturized, the movements of the background camera must be appropriately scaled to the size of the miniature set. As can be appreciated, the economics realized by using a miniature set can reduce the cost of production while also permitting improved visual special effects. It should also be borne in mind that this technique, however, is not limited to a situation where life-size actors are placed into a miniature set. It also finds application in the remote control of cameras generally such as where, for example, the environment of one or both of the cameras controlled is adverse by being dangerous, relatively inaccessible or the like.

Typically, the foreground camera is mounted on a four-wheel dolly which is steered by an operator while the cameraman rides thereon and shoots the scene being filmed. The dolly is driven and steered by means of all four wheels, wherein all four wheels pointed in the same direction at one time to provide a constant heading. It is, therefore, capable of moving along the ground plane or stage floor in a limitless variety of travel paths. The position and perspective in which the foreground camera views its scene must be duplicated with great accuracy and effectiveness in the background camera along the x, y, z, yaw and pitch axes.

The prior art systems that have utilized a dolly-mounted foreground camera have recognized and have attempted to compensate and correct for errors such as gear back lash, low frequency reasonances in the high gain servo system, electronic noise and unevenness in the stage floor.

The primary consideration in the optical areas has been compensation for the off-axis location of the optical lens of the camera relative to the kinematic pivotal point of the camera. This optical compensation was necessary to insure that registration would be maintained during movement of the foreground camera as the optical lens tracked an arc during pan or tilt movement. For example, the teachings of the U.S. Pat. No. 3,914,540 provided an electrical circuit correction to compensate for this optical misalignment of the foreground and background cameras. The prior art has not provided correlated optical systems to permit maintenance of image registration for a full simulation of the optical characteristics of the foreground camera in a scaled down version in the background camera during variable focussing and panning. The focussing problems that existed are a result of the depth of field variances and foreground object movement relative to camera position which provided severe limitations on the use of composite photography. To date, the prior art has been incapable of providing composite image registration during focussing of at least one camera and during panning.

An additional need has existed in the prior art to provide improved optical scanning probes of minimum altitude and dual fields of view for use in simulators. Of general interest is the article "Optical Scanning Probe Technology" by M. Shenker SPIE Vol. 59, pg. 71 (1975) Simulators and Simulation.

The prior art is still seeking to provide composite photography image systems capable of a high magnification for projection of aberration free images, such as in wide screen movies while permitting variable focussing capability and accurate registration of images.

SUMMARY OF THE INVENTION

The present invention improves composite photography systems that utilize a pair of servo connected cameras to integrate the picture taking of foreground objects with background objects. One camera would be directed at foreground objects, for example, a normal size object such as live actors, while the other camera would be directed at background objects in a different setting such as a miniaturized scale model. By appropriate color keying of the stage behind the foreground objects, it is possible to synthesize realistic images in a travelling matte technique.

The present invention recognizes and identifies some of the special optical problems that have been associated with composite photography systems having scaled relationships between the foreground and background objects. Various suggested lens systems that have been designed to coordinate the optical requirements of a matching of the foreground and background cameras are provided. These lens systems are designed to eliminate any magnification variation of an image in either system as that specific lens system is being focussed to maintain the object within the depth of field of the lens system. The term "image magnification variation" used in the remainder of this document includes all orders of distortion as well as first order properties. Image magnification change during focussing has been a constant problem and has placed severe limitations on the use of prior composite photography systems. For example, it has not been possible to vary the focus in one lens system because of the resultant image magnification change for near objects that creates a misregistration with the image of the objects in the other lens system.

Stationary entrance pupil positions have been provided in both the foreground and background optical systems to prevent any misregistration occurring between these images and across the field of view during panning and/or focussing. Also, pupil aberration and distortion that would result from translational motion of the lens entrance pupil have been controlled.

Other advantageous optical design features have been incorporated such as a minimum altitude of the background lens, the capability to rotate the image in the background lens to accommodate for any rotational misregistration from the foreground lens, the minimizing of distortion and aberrations and the presentation of relatively economical lens parameters for realizing the purposes of the present invention while maintaining a metric accuracy of better than one part in 750 of the format for a television background and better than a one part in 3,000 of the format for a movie background.

The background lens incorporates novel features that render it useful by itself in simulators.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS

FIG. 1 is a perspective view, partly diagramatic, of a composite photography system in which the present invention may be used;

FIG. 2 is a schematic view of one embodiment of a television foreground narrow angle lens system focussed at a close position in accordance with the teachings of the present invention;

FIG. 3 is a partial schematic view of the television foreground lens system of FIG. 2 wherein the last lens group has been moved to focus at infinity;

FIG. 4 is a schematic view of a television foreground lens system for a wide angle field of view focussed at infinity;

FIG. 5 is a schematic lens view of a wide angle television background lens system with the relative distances between the lens groups being abridged due to the actual physical size of the lens and a replaceable doublet disclosed to provide a narrow angle field of view;

FIG. 6 is a schematic view of a narrow angle movie background lens system with a telescoping doublet disclosed that is capable of being inserted to provide a wide angle field of view;

FIG. 7 is a schematic view of a narrow angle foreground movie lens system at a close focus;

FIG. 8 is a schematic view of a wide angle movie foreground lens system focussed at infinity;

FIG. 25 is a schematic view of a lens system to illustrate classical spherical aberration of the entrance pupil.

DESCRIPTION OF THE PREFERRED EMBODIMENTS

Figure 9:
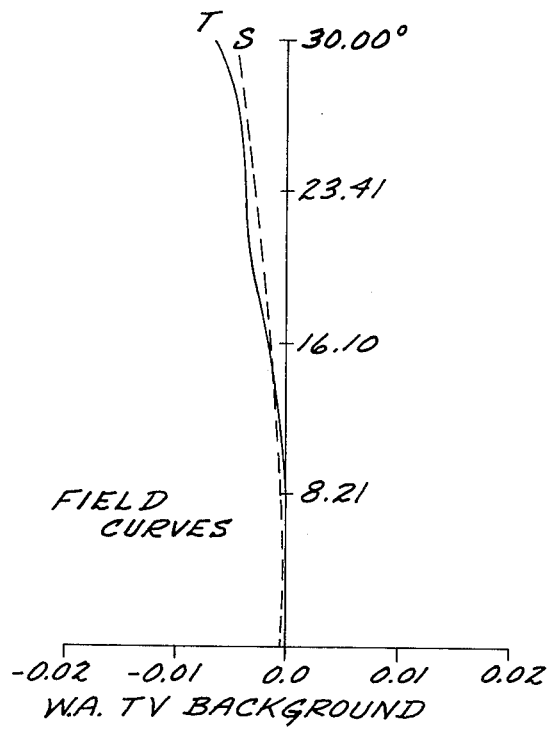
FIGS. 9 through 24 are respectively plotted graphs of astigmatism and distortion for the above lens systems of the present invention.

The following description is provided to enable any person skilled in the motion picture, television and simulator field to make and use the invention and sets forth the best modes contemplated by the inventor for carrying out his invention. Various modifications, however, will remain readily apparent to those skilled in the art, since the generic principles of the invention have been defined herein, specifically to provide a relatively economical composite photography system having correlated foreground and background optical systems that can be used both in video and film formats.

Referring to FIG. 1, a schematic perspective view of a composite photography system 2 is provided. An appropriate foreground stage 4 can be covered with a blue matte on the floor, sidewalls and rear wall. The visible surfaces of the foreground camera 6 are colored blue or otherwise treated to perform a keying function. An actor 8 is shown performing on the foreground stage 4 within the field of view of the foreground camera 6. The camera 6 is illustrated as being a television camera, however, it could be a movie camera in certain embodiments of the present invention.

Camera 6, with a foreground optical system 15, is mounted on a dolly 10 which supports a platform 12 with a stanchion 14 projecting upward from it. A boom 16 is bifurcated to provide a pair of legs which are journal to the stanchion 14 for pivotal rotation about a horizontal axis (not shown) which is parallel to the ground plane or stage floor.

The dolly 10 has means provided thereon for pivotally mounting the boom 16 between uppermost and lowermost positions, including a pentograph device for maintaining the axis of camera support pedestal 18 vertical during such movement. A cameraman 20 directly controls the foreground camera 6.

The video output of the foreground camera 6 is fed through a cable 22 to a video control box 45. Signals carrying intelligence as to the movement of foreground camera 6 horizontally, vertically and in yaw and pitch are fed through a cable 24 to control unit 26 and from the control unit 26 through cable 28 to an electronic servo control circuits 30.

A background camera 32 having a background optical system 34 views a miniature scene indicated generally at 36 which can be accurately positioned relative to a reference level of the spatial position of the background optical system. A movable mirror 68 can be controlled by a transducer for tilt control. A transducer 64 is operatively connected to the servo control 30 by a cable 66 to permit image rotation, for example, by a single dove or pechan prism.

As should be appreciated, the composite photography system 2 of the present invention, is particularly advantageous with the use of a scaled down background miniature set. A plurality of miniature sets such as 36 can be prepared prior to the actual recording session and hydraulic tables equipped with casters can be utilized to roll the various desired miniature sets into place beneath the background camera gantry 38. A support stand or gantry 38 for the background camera 32 includes a fixed rectangular frame 40 supported at each of its corners by four vertical legs 42. The gantry 38 further includes a pair of parallel disposed side legs 44 and 46. A rectangular dolly frame 48 is mounted for linear movement on the respective legs 44 and 46 of the gantry 48. For purposes of reference, the direction of movement of the rectangular dolly frame 48 will be indicated as the y direction. The dolly frame 48 further includes a pair of spaced parallel legs 50 and 52 on which is mounted a carrier member 54 for transverse movement along these legs in an x direction. The carrier member 54 directly supports the background camera 32.

Signals from the electronic servo-control circuits 30, which are derived as a result of the movement of the foreground camera 6 and supplied by way of cable 56 to the gantry 38, and its respective motors mounted thereon (not shown), are then used to control the movement of the background camera 32 along the x, y, z, yaw and pitch axes, as explained more fully in the Trumbull et al. U.S. Pat. No. 3,902,798.

The video output of the background camera 32 is fed over cable 58 to the video control circuit 45. The output of video control circuit 45 may be either supplied to a monitor 60 or to a tape recorder 62 or both. The video control circuit 45 combines the video signals from the foreground camera 6 and the background camera 32, according to the moving matte technique.

As mentioned above, the use of miniature sets that permit the integration of images of live actors to provide synthesized realistic images are important. The use, however, of a different scale between the normal size foreground objects and the miniaturized background objects requires a scaling transformation of optical requirements to provide a precise registration matching of the images.

The present invention recognizes and identifies some of the special problems that have been associated with composite photography systems having scaled relationships between the foreground and background objects. For example, the magnification between object and an image will vary somewhat, for a constant focal length system, as the lens system is focussed to maintain the object within the depth of field of the lens system. The practical result of this image magnification variation is to vary the size of the image during a focussing operation. Generally, the image magnification is not apparent in a single optical system since the principle object and the secondary objects in the scene, e.g., foreground actor and background props, will experience the same magnification change and maintain a proper registration. However, when only one of the objects has a magnification change of its image, a serious source of composite image registration error occurs. As can be appreciated, the composite image will have an unbalanced relationship and may even overlap to ruin the illusion of a realistic synthesized image. For this reason, composite photography systems were severely limited in both positioning of the foreground object relative to the camera and optical system's depth of field and in their flexibility to match existing lighting. Basically, an aperture stop was selected of appropriate depth of field, lighting was arranged accordingly (or vice versa) and the lens system was focussed. This focus was fixed and the object being photographed could not be moved beyond that depth of field without experiencing a defocussed condition.

Obviously, the magnification and focussing problems severely limit the versatility of a composite photography system particularly in an artistic industry such as television and movies.

Another problem in the prior art has been traced, in the present invention, to the variance in entrance pupil positioning in both the foreground and background optical systems. As a result, pupil aberration, misregistration, and distortion occurred across the field of view during panning and were introduced into the image due to axial motion of the lens entrance pupil with field. The unique foreground and background optical systems of the present invention solve this problem by providing negligible spherical and chromatic aberrations of the entrance pupils that further remain stationary during focussing.

These solutions were provided while permitting a background minimum altitude of approximately 0.36 inches, that is, the operative position of the background lens above the horizontal base level of the miniature set with a speed for the background optical system of f/11.0.

Ideally, the following parameters would be changed by a scale factor ratio representative of the actual miniaturization of the background objects relative to that of the normal size foreground objects; film size, lens diameter, lens focal length, lens pupil aberrations, wave length of light, translational motion of lens entrance pupil and magnification ratios. The actual scaling of some of these factors is practically not possible. For example, scaling the film size is not practical. Instead, the lens focal length is forced to map a constant angle of view onto the film frame and as long as the relationship between the focal lengths remains constant, the film size can be the same for both optical systems. As can be appreciated by holding the focal lengths constant a design option relating to maintaining the image magnification also constant between foreground and background is eliminated.

Additionally, the wavelength of light cannot be practically scaled by the ratio of background object size to foreground object size. The scaling of the translational motion of the lens entrance pupil during focussing is also not practical due to the corresponding limitation and complexities it would introduce in the optical lens systems. Instead, the entrance pupil is located in front of the optics allowing the placement of a minimum sized pitch scan mirror for the background system at the perspective viewpoint, and positioning algorithms are used that completely orthogonalize the axes of the background lens system motions.

Additionally, the tolerance of the transverse motion and/or spherical aberration of the pupil center was determined to be on the order of plus or minus the near focussing distance divided by the metric accuracy required. Thus, for a 3-inch near focussing distance and a metric accuracy of one part in 750 for a television background, the tolerance is ±0.001". The fact that diffraction and/or aberration spreads the energy into a blur and that the video detectors are limited in spatial bandwidth, for example, to the 20-50 lines/mm domain loosens the tolerance in the video field. Additionally, the ability of the human eye to find the center of a point spread function is limited to approximately one tenth of the point spread function diameter and an out of focus image would move one tenth of its diameter if the entrance pupil laterally shifted one tenth of its diameter with focus or field of view. This tolerance limitation is only meaningful for the maximum aperture setting since stopping down the lens increases the size of the in focus blur due to diffraction, etc.

If the translational motion of the lens entrance pupil exceeds these tolerance values with field angle, then panning will cause residual motions between foreground and background that will be perceivable to the viewer.

In an effort to simplify the optical design and construction costs, an additional design choice was made to modularize the lens systems. Accordingly, the foreground optical systems were split into two separate lens systems to accommodate a wide angle mode of operation (60°) and also a narrow angle mode of operation (20°). As can be appreciated, a varifocal or zoom lens could replace the two separate systems but the additional complexities in design and cost were believed unwarranted in establishing the operativeness of the present invention. Thus, while the teachings of the present invention encompass a single lens system the principles are hereby illustrated with two separate lens systems.

This design choice was further exercised in the background lens design wherein a single lens construction was provided but replaceable doublet relay lens groups were used for the wide angle mode of operation and for the narrow angle mode of operation which are positioned in the lens system in a collimated image space.

In the background optical system, a long physical distance from the pivoting mirror to the background camera is not detrimental and, in fact, is preferable for interfacing with the miniature set. This physical distance, in the order of 92 inches permits the movement of a field lens plus first relay group followed by a collimated axial beam to perform a focussing movement in a wide angle mode of operation. To further simplify the wide angle system, a stationary stop in the relay image space was found to be permissible since the focus motion of approximately 0.3 inches divided by the tolerable entrance pupil motion was found to be less than the longitudinal magnification (that is the square of the ratio of the stop aperture divided by the entrance pupil diameter).

Thus an extremely simple focussing method in a lens system, having a substantially stationary entrance pupil, an objective lens group, a stop and a rear relay group, with only one moving lens group is provided and yet importantly, sufficient image quality is still maintained. Although a one group focussing is disclosed, it should be readily recognized that other more complex focussing modes can be adopted within the scope of the present invention, for example, a three moving group front objective. For purposes of the present invention, it is simply necessary to maintain a constant image magnification during focussing and accordingly, the present invention should not be considered limited to the particular illustration of focussing disclosed herein.

In the design of the following lens systems, the specific lens parameters were derived after a consideration of both optical image quality and economic factors. In the subsequent lens drawings which support this specification and supplement the parameters of the lens systems as set forth in the following tables, the lenses in accordance with the present invention, are illustrated diagrammatically. As usual, in conventional lens diagrams, the light is assumed to travel from left to right. The axial spacings are measured from left to right with consecutive numbers. Additionally, the radius of curvatures are directional in the Tables in sequence from left to right. The symbols of axial spacings (both air spaces and lens thickness) and radius of curvatures have been omitted from the drawings for sake of clarity in view of the ray traces which are believed to provide additional information to an optical designer skilled in this field.

In the Tables, the minus signs (—) indicated surfaces concave toward the object side, while the surfaces without a sign are convex toward the object side. The Tables also disclose the axial spacings along the optical axis and include both the axial spacings between the lens elements and thickness of the lens elements. The axial spacings between the lens elements are positioned accordingly, relative to the radii in the Tables while the thicknesses are designated accordingly, on the same line as the radii. Zero axial spacing indicates lens elements cemented to each other. All other axial spacing greater than zero refer to air spacing. The dimensions in the Tables are given in inches, however, it should be readily appreciated that the actual linear dimensions can be given in absolute values with reference to an eqivalent focal length of unit. The Tables also provide with respect to each example, the Abbe number and the index of refraction.

In each of the lens system embodiments provided herein, the wide angle field of view is approximately 60 degrees while the narrow angle field of view is approximately 20 degrees.

Referring to FIG. 2, a schematic of a foreground narrow angle lens system of f/2.8 usable for a video format is disclosed.

The lens system comprises nine lens elements. The resulting metric match provided by the foreground lens system to the narrow angle mode of the television background lens is better than 1/1000 from a near object distance of 30 inches to infinity. The total field of view for the horizontal is approximately 17.5° and for the diagonal is approximately 22°. This lens provides an illumination uniformity vs. field of less than plus or minus 10%; a maximum distortion of plus 1.6% and a transverse entrance pupil aberration of less than plus or minus 0.004 inches.

The first lens group 100 is stationary and forms a nearly afocal lens unit. The first two lenses, from left to right, are negative meniscus lenses 108 and 110. The next two lenses are a pair of positive meniscus lenses 112 and 114. A negative meniscus lens 116 is provided as the last lens in the fixed group 100. A stop 118 is mounted in the image space before a moving group of lenses 102 that is used for focussing purposes. A conventional focussing mechanism (not shown) is provided to move the lenses as can be seen from the ray trace between FIGS. 2 and 3 for focussing. The lenses, as positioned in FIG. 2, are disclosed in a close object position wherein the focus is set at 30 inches. The lenses disclosed in FIG. 3 are positioned for focussing at infinity. The first lens of the moving group is a negative meniscus lens 120 positioned adjacent a doublet 122. The final lens 124 is a double convex lens. A conventional dichroic beam splitter is disclosed at 126 for use with a television color camera.

A broad principle of the present invention can be appreciated from FIGS. 2 and 3. As can be seen from the focussing lens movement and the ray traces, focussing is accomplished by movement of a lens group 102 that is located between the stop 118 and the focal plane. All of the lens elements on the object side of the stop 118 remain stationary during focussing with respect to the object and the focal plane. Therefore, the entrance pupil position is not effected by this focussing movement behind the stop and accordingly, remains stationary. The design of the first lens group 100 assures that all the entrance pupils defined by the off-axial chief rays are substantially coincident. This design approach can be compared with the classical lens design of FIG. 25.

FIG. 25 is provided to simply illustrate the resulting spherical aberration of the pupil that occurs in a normal objective lens system. This spherical aberration is disclosed as the longitudinal displacement, SA, of the entrance pupil as a function of field angle. Thus, the full field chief ray, a, defines an entrance pupil position that is offset by the optical axis distance, SA, from the entrance pupil position of an off-axial chief ray at a midfield position, b. The movement of the entrance pupil creates a variant relationship to spaced objects in the field of view or in other words, the entrance pupils will subtend different fields of view at different positions for off-axial objects. This is not a problem in a static picture taking mode such as a still camera but creates an apparent lateral movement in the image between foreground and background objects during panning of both cameras. This apparent lateral movement results in misregistration in a composite image system. The present invention eliminates this problem by insuring a substantially stationary entrance pupil with field which produces only small metric errors within allowable tolerances.

Additionally, the provision of an external entrance pupil permits panning about this point in the background system with a scan mirror located at the entrance pupil. The use of an external entrance pupil in the background system further permits the background camera to get as close as possible to the model to provide a proper perspective to a viewer.

Figure 15:
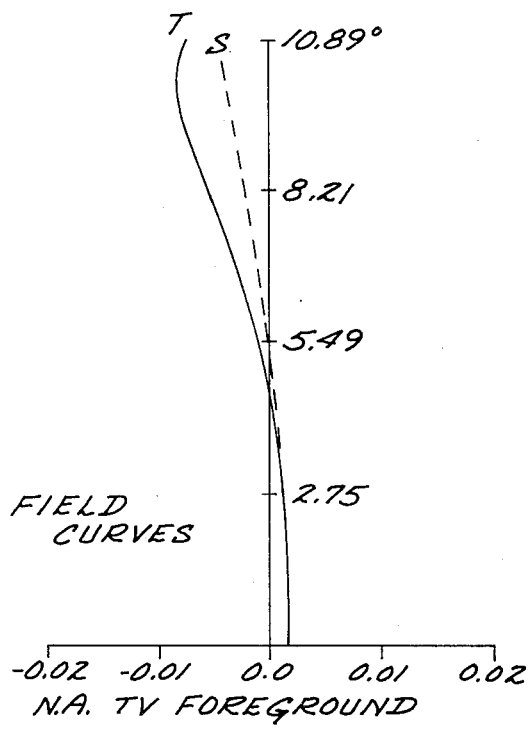
Figure 16:
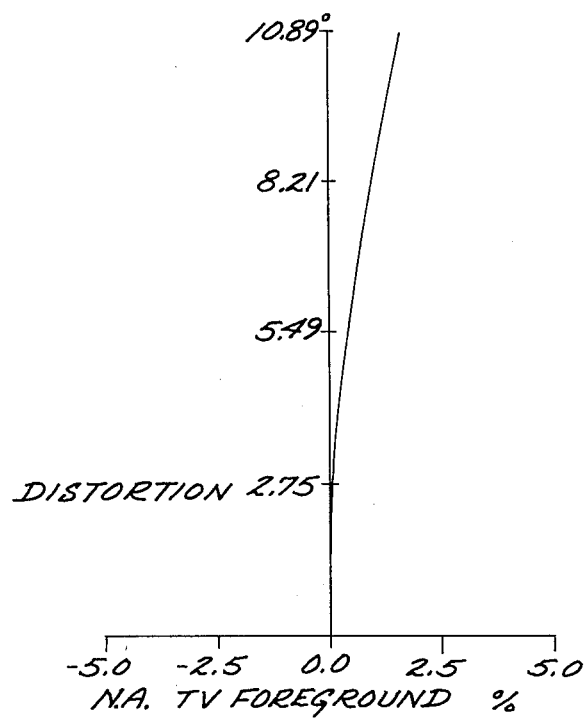

The parameters of this lens design are disclosed in the following Table 1 and the astigmatism and distortion are plotted respectively in FIGS. 15 and 16. The effective focal length is 2.184 and the field is ±10.89°.

TABLE 1

| ELEMENT | T.V. FOREGROUND N.A. | | | |
|---|---|---|---|---|
| | $R_1$ | $R_2$ | T | N/V |
| $L_1$ | 243.7806 | 7.7411 | .3000 | 1.487/70.4 |
| | | | .5239 | |
| $L_2$ | −2.0702 | 40.1118 | .2300 | 1.785/26.1 |
| | | | .3438 | |
| $L_3$ | −6.3980 | −2.1841 | .4933 | 1.750/35.0 |
| | | | .0200 | |
| $L_4$ | 2.5033 | 27.2883 | .6200 | 1.682/48.2 |
| | | | .8520 | 1.517/64.2 |
| $L_5$ | 2.1219 | .9908 | .4200 | |
| | | | 2.5308 | |
| APERTURE STOP | | | | |
| | | | 1.2888–1.1050* | |
| $L_6$ | 5.6598 | 1.9319 | .3250 | 1.755/27.6 |
| | | | .1978 | |
| $L_7$ | −10.6363 | −.9291 | .3919 | 1.517/52.2 |
| $L_8$ | −.9291 | −1.7537 | .1500 | 1.699/30.1 |
| | | | .0200–.0430* | |
| $L_9$ | 3.9300 | −2.1984 | .3500 | 1.613/57.4 |
| | | | .9526–1.1125* | |
| $L_{10}$ | INF | INF | 2.590 | 1.517/64.2 |

*Focussing motion for object distance from infinity to 25 inches.

Where the lens element positions $L_x$, are consecutively taken from left to right; $R_1$ is the object side radius of curvature; $R_2$ is the image side radius of curvature; T is the axial distances including lens thicknesses on the same line as the radius of curvature and lens spacings between the radius of curvature and the specific type of glass is disclosed for each lens by index of refraction and Abbe number.

Referring to FIG. 4, a schematic of a television foreground camera for a wide angle field of view is disclosed. In selecting this design, the parameters of both compactness and simplicity were chosen. For this reason a separate wide angle foreground lens system rather than a combined varifocal lens system was used. The lens design has stationary optical elements up to the stop with one moving group behind the stop for focussing. The considerations involved in both focussing and panning again requires that the entrance pupil be stationary with focus and with field. This was accomplished by providing a lens having a f/2.8 speed and being capable of focussing to within 30 inches of the camera and to infinity with a distortion variation during focus of less than one part in 1100. The distortion was no greater than −2% while the transverse entrance pupil aberration was maintained to be less than ±0.018 inches.

The stationary first lens group 128 comprises from left to right a pair of negative meniscus lenses 134 and 136 and a double concave lens 138. A cemented doublet 140 is immediately positioned adjacent a double convex lens 142. A negative meniscus lens 144 completes the first stationary group. The stop 146 is positioned in the image space preceding a moving focussing lens group 130. The moving lens group includes a negative meniscus 148 adjacent a cemented doublet 150 and finally a double convex lens 152. Again a dichroic beam splitter 132 is disclosed.

Figure 13:
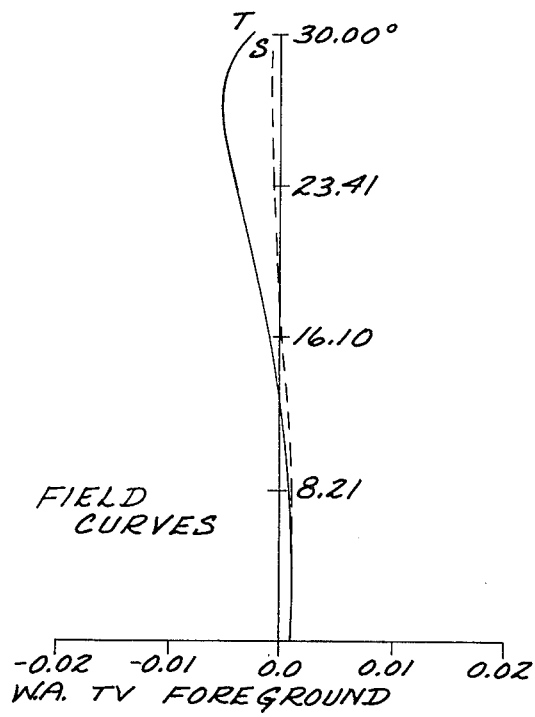
Figure 14:
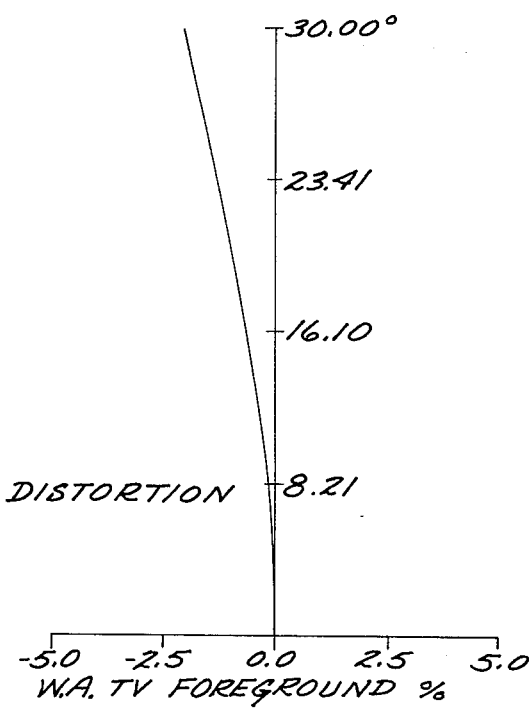

The plot of astigmatism for this lens is disclosed in FIG. 13 while distortion is disclosed in FIG. 14. The following Table 2 provides the design parameters for this lens. The effective focal length is 0.728 while the field of view is ±30°.

TABLE 2

| ELEMENT | T.V. FOREGROUND W.A. | | | |
|---|---|---|---|---|
| | $R_1$ | $R_2$ | T | N/V |
| $L_1$ | 7.1881 | 1.7284 | .3000 | 1.613/57.4 |
| | | | .5172 | |
| $L_2$ | −69.6418 | 2.2998 | .1800 | 1.613/57.4 |
| | | | .4688 | |
| $L_3$ | −4.9464 | 4.1043 | .1800 | 1.613/57.4 |
| | | | .2847 | |
| $L_4$ | 4.8318 | 2.0249 | .1800 | 1.755/27.6 |
| $L_5$ | 2.0249 | −3.2428 | 1.2791 | 1.702/41.0 |
| | | | .0250 | |
| $L_6$ | 2.7201 | −10.6614 | .7156 | 1.639/55.4 |
| | | | .3827 | |
| $L_7$ | 3.7041 | 1.1792 | .2400 | 1.678/55.2 |
| | | | 3.1259 | |
| APERTURE STOP | | | | |
| | | | 1.2303–1.2114* | |
| $L_8$ | 3.0262 | 1.7214 | .1500 | 1.755/27.6 |
| | | | .1610 | |
| $L_9$ | 5.7825 | −1.0570 | .4878 | 1.532/48.8 |
| $L_{10}$ | −1.0570 | −2.0138 | .1500 | 1.755/27.6 |
| | | | .0250 | |
| $L_{11}$ | 2.6075 | −2.4395 | .4000 | 1.518/65.1 |
| | | | .5200–.5389* | |
| $L_{12}$ | ∞ | ∞ | 2.597 | 1.517/64.2 |

*Focussing motion for object distance from infinity to 27.7 inches.

FIG. 5 discloses a wide angle television background lens system while FIG. 6 discloses the movie background lens system. These lens systems would be appropriately used as the background optical system 34 in FIG. 1. Both of these lens designs use the same basic conceptual approach with the exception, that the entrance pupil diameter, focal length and format have been scaled up by approximately 45 percent in the movie background lens system.

In an effort to simplify the design, it was decided to provide a varifocal capability by the use of two separate iris diaphragms positioned appropriately and interchangeable doublet relays. Basically, a telecentric objective is provided with one aspherized surface near the first image to correct residual pupil aberration. A collimating doublet relay is used in the narrow angle mode of operation. An iris diaphragm is then positioned for the narrow angle mode and is required to open up at least four inches or else to move out of the image transmission path when in the wide angle mode of operation. Additionally, an iris diaphragm for the wide angle mode is positioned in the image space after the telescopic doublet in the lens system and must be able to open to approximately 2.3 inches or to be removed when the lens system is in a narrow angle mode of operation. Finally, a field lens is provided and an image rotator is incorporated such as a Harting dove prism or single dove prism. The dove prism is positioned in essentially parallel light rays in the lens system and is capable of rotating the image about a 360 degree range. As shown in both FIGS. 5 and 6, the size of the prism is not to the same scale as the other lenses. Thus, any rotation off the vertical axis of the foreground camera 6 can be appropriately corrected by activation of the transducer 64 to rotate the above prism under command of the electronic servo control 30. It should be noted that special glasses can be utilized in the doublets to reduce secondary axial color. A major advantage of this lens design is that the desired metric stability is obtained while focussing only one lens group and the entrance pupil is almost perfectly stationary.

Referring to FIG. 5, the front stationary telecentric objective includes, from left to right, a doublet formed of a pair of negative meniscus lens 164 and 166, a double convex lens 168, a doublet 170, a positive meniscus lens 172 with an aspherized surface adjacent its image space, a negative meniscus lens 174, a telescopic doublet relays lens 176, an achromat doublet lens 178, a single dove prism 158, a doublet field lens 160 and the beam splitter 162. As explained above, a collimating doublet relay lens 180, for use in the narrow angle mode of operation, can be used to replace the telescopic doublet relay 176. As mentioned earlier, the iris diaphragm 182, for the narrow angle mode of operation, must either be moved out of the lens system for the wide angle mode of operation or have an aperture that is sufficiently large (e.g. ~4.0 inches) to remove itself from impacting the image forming light. Likewise, the wide angle iris diaphragm 184 must be capable of being removed from the image transmission in the narrow angle field of view or opened about ~2.3 inches. The lens has a F. No. of F/11 with a total field of view in the horizontal of approximately 50° and in the diagonal of 60°. The minimum altitude of the lens system is 0.36 inches. The illumination uniformity versus the field of view is a plus or minus 10%. The distortion is no greater than −2.0% with a distortion variation during focussing of one part in 1150. It should be appreciated that in standard photographic objective lenses, changes in focussing from far to near distances provide magnification changes in the order of 1 to 3 while composite photography requires a minimum of changes in the order of 1 part to a range of 100 to 10,000.

The effective focal length is 0.728 and the field is ±30° for the wide angle (W.A.) mode of operation. The narrow angle (N.A.) mode of operation has an effective focal length of 2.184 and the field is ±10.89°.

Figure 10:
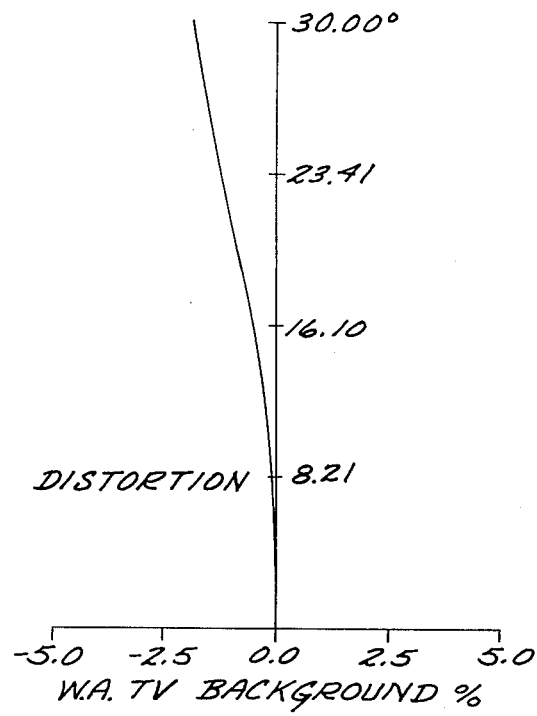
Figure 21:
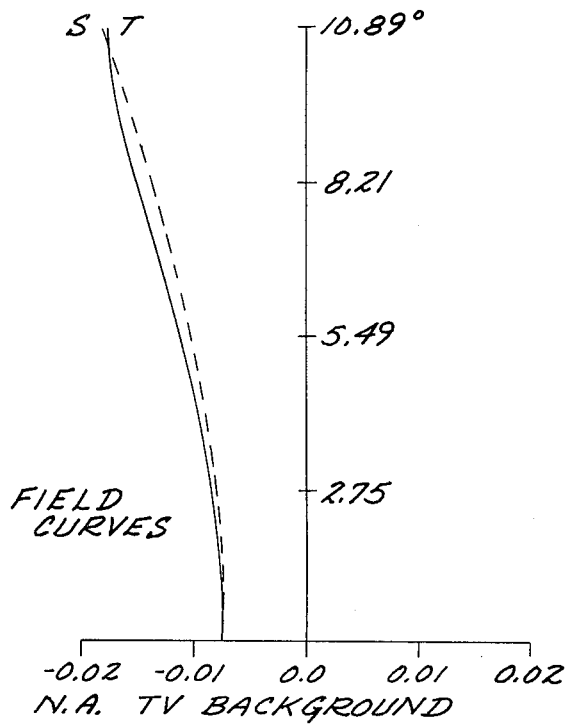
Figure 22:
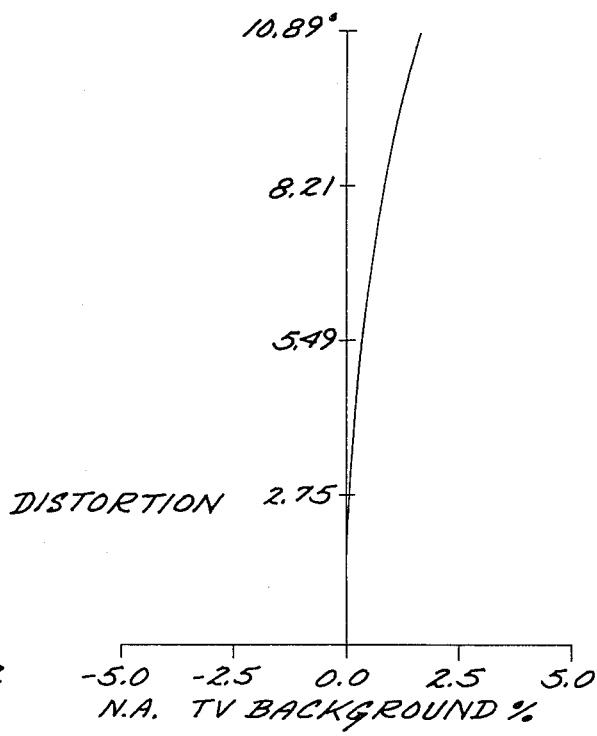

The astigmatism for the wide angle T.V. background system is disclosed in FIG. 9 while the distortion is disclosed in FIG. 10. The parameters of this lens design are set forth in the following Table 3 wherein the symbol N.A. refers to the narrow angle mode of operation. The astigmatism for the narrow angle T.V. background system is disclosed in FIG. 21 while the distortion is disclosed in FIG. 22.

TABLE 3

| ELEMENT | T.V. BACKGROUND | | | |
|---|---|---|---|---|
| | $R_1$ | $R_2$ | T | N/V |
| ENTRANCE PUPIL | | | | |
| | | | 600 | |
| $L_1$ | −.3831 | −.5001 | .1800 | 1.689/31.2 |
| $L_2$ | −.5001 | −.6377 | .2778 | 1.682/48.2 |
| | | | .0200 | |
| $L_3$ | 9.2843 | −1.6608 | .2991 | 1.682/48.2 |
| | | | .9704 | |
| $L_4$ | 20.0454 | −1.2503 | .4130 | 1.682/48.2 |
| $L_5$ | −1.2503 | −58.4298 | .1496 | 1.785/25.8 |

TABLE 3-continued

| | | | T.V. BACKGROUND | | |
|---|---|---|---|---|---|
| $L_6$ | 1.8554 | A(1) | .1908 .2812 1.5507-2.2492* | | 1.623/56.9 |
| $L_7$ | −1.1587 | −1.3603 | .0100 .4497 9.4116 (N.A.) 33.1327 (W.A.) | | 1.620/63.5 |
| $L_8$ | −65.5888(WA) −27.1614(NA) | 114.8079(WA) 9.7697(NA) | .2500 .2500 (N.A.) .2875 (W.A.) | | 1.717/29.5 |
| $L_9$ | 41.6919(WA) 16.3449(NA) | −20.4917(WA) −4.4304(NA) | .3750 (W.A.) 5.2465-4.5480* | | 1.620/63.5 |
| APERTURE STOP (W.A.) ONLY | | | | | |
| $L_{10}$ | INF | INF | 0.0 (W.A.) 15.0077 (N.A.) 12.6360 13.2643 | | 1.517/64.2 |
| $L_{11}$ | 12.9564 | −6.9700 | .4564 .0639 | | 1.620/63.5 |
| $L_{12}$ | −6.7227 | 121.1455 | .2500 11.3847 | | 1.613/44.3 |
| APERTURE STOP (N.A. ONLY) | | | | | |
| | | | 5.3327 | | |
| $L_{13}$ | 5.1092 | 1.9027 | .1200 | | 1.648/33.9 |
| $L_{14}$ | 1.9027 | −35.4037 | .3200 2.500 | | 1.517/64.2 |
| $L_{15}$ | INF | INF | 2.597 | | 1.517/64.2 |

ASPHERIC CONSTANTS $$Z = \frac{(CURV)Y^2}{1 + (1 - (1+K)(CURV)^2 Y^2)^{\frac{1}{2}}} + (A)Y^4 + (B)Y^6 + (C)Y^8 + (D)Y^{10}$$

| ASPHERIC | CURV | K | A | B |
|---|---|---|---|---|
| A(1) | .11292133 | 0.000000 | .0666574 | −.0641578 |

| C | D | | | |
|---|---|---|---|---|
| .103504 | −.061565 | | | |

*Focussing motion for object distance from infinity to 3.0 inches.

The lens system includes, from left to right, a doublet formed of a negative meniscus lens 186 and a positive meniscus lens 188, a positive meniscus lens 190, a doublet 192, a doublet 194 with an aspherized surface adjacent its image space, a weak meniscus field lens 196, a removable collimating doublet relay 198 used for the telephoto mode, a narrow angle iris diaphragm 200, a single dove prism 202, an achromatic doublet 204, a wide angle iris diaphragm 206, a doublet field lens 208 and a beam splitter 210. In FIG. 6, the movie background lens system is disclosed with the collimating doublet relay 198 in the lens system to provide a narrow angle field of view. Again, the movie background lens system is designed to be switched from a telephoto to a wide angle mode of operation, by simply replacing the collimating doublet relay 198 with a telescopic doublet relay 212.

As mentioned above, the iris diaphragm 200, for the telephoto mode of operation, must either be removed from the lens system during the wide angle mode of operation or have an aperture that can be opened sufficiently large to prevent it from vignetting. Likewise, the wide angle iris diaphragm 206 must be capable of being removed for telephoto field of view operation or opened wide enough to prevent any ray interference. The lens has an F. No. of F/11 with a wide field of view in the horizontal plane of approximately 50 degrees and across the diagonal of 60 degrees and a telephoto field of view of ⅓ of these values. The minimum altitude of the lens system is 0.41 inches. The illumination uniformity versus the field of view is ±10%. The distortion is no greater than −2% with a distortion variation during focussing of one part in 3500. The transverse entrance pupil aberration is less than ±0.002. The aspherical surface on the doublet field lens 194 helps control residual spherical aberration of the entrance pupil.

This lens system is capable of maintaining a variation of the image height from 3.0 inches to infinity of less than 0.00035 inches in both the wide angle and narrow angle modes of operation for a 35 mm motion picture format.

Figure 11:
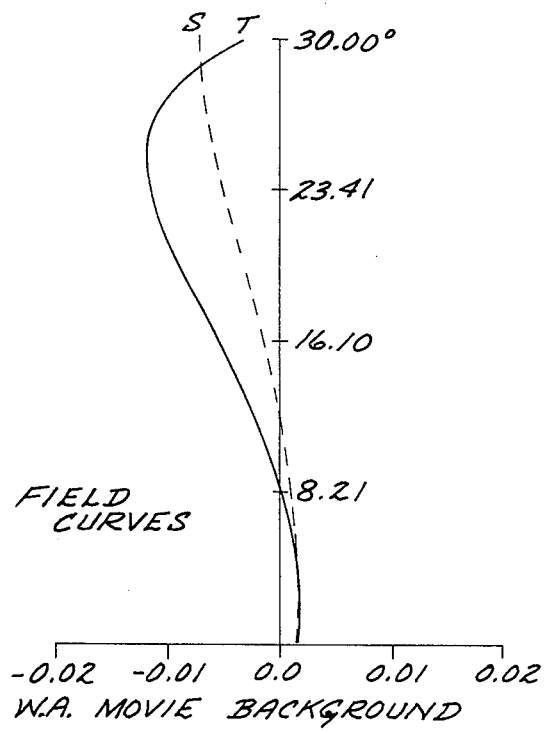
Figure 12:
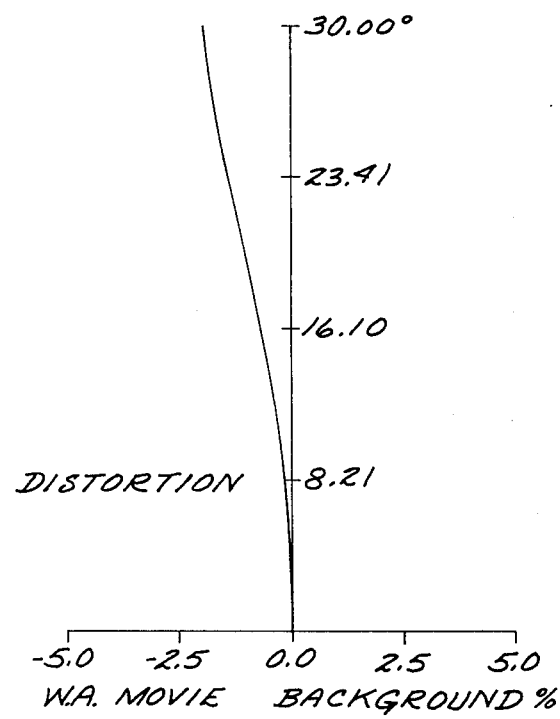
Figure 23:
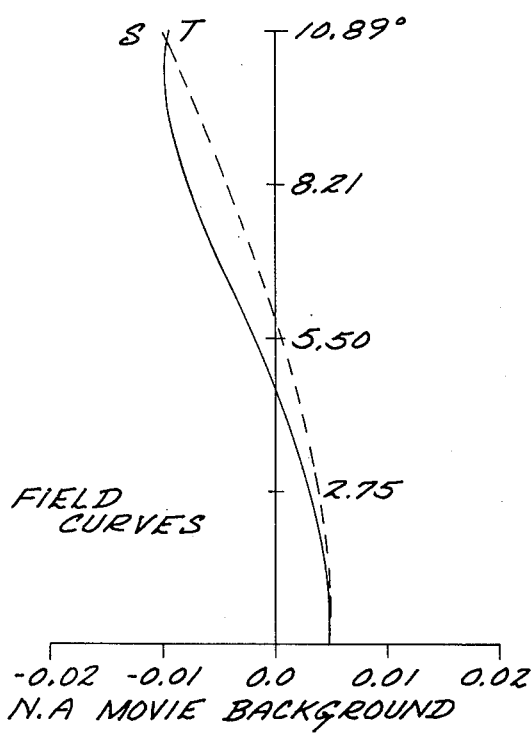
Figure 24:

The astigmatism for a wide angle movie background system is disclosed in FIG. 11 while the distortion is disclosed in FIG. 12. The parameters of this lens design are set forth in the following Table 4. The effective focal length is 1.061 for the wide angle mode of operation with a field of ±30° while the effective focal length for the telephoto mode of operation is 3.165 with a field of ±10.89°. The astigmatism for the narrow angle mode of operation is disclosed in FIG. 23 while the distortion is disclosed in FIG. 24.

TABLE 4

| | | MOVIE BACKGROUND | | |
|---|---|---|---|---|
| ELEMENT | $R_1$ | $R_2$ | T | N/V |
| ENTRANCE PUPIL | | | | |
| | | | .4100 | |
| $L_1$ | −.5333 | −2.7433 | .2306 | 1.755/27.6 |

TABLE 4-continued

| | MOVIE BACKGROUND | | | |
|---|---|---|---|---|
| $L_2$ | −2.7433 | −.9113 | .3613 | 1.682/48.2 |
| | | | .0194 | |
| $L_3$ | −13.5624 | −1.5431 | .3833 | 1.682/48.2 |
| $L_4$ | 5.5455 | −1.7100 | .6000 | 1.682/48.2 |
| $L_5$ | −1.7100 | −81.2716 | .1916 | 1.785.25.8 |
| | | | .0321 | |
| $L_6$ | 2.1318 | −175.3409 | .4806 | 1.744/44.8 |
| | | | .0180 | |
| $L_7$ | 522.5875 | A(1) | .1916 | 1.620/63.5 |
| | | | .8225−1.9045* | |
| $L_8$ | −1.2290 | −1.4284 | .3861 | 1.658/50.9 |
| | | | 32.5192 (W.A.) | |
| | | | 10.0380 (N.A.) | |
| $L_9$ | −52.3494 (WA) | 76.8036(WA) | .3203 | 1.717/29.5 |
| | −47.9893 (NA) | 10.9762(NA) | | |
| | | | .2500 (W.A.) | |
| | | | .0800 (N.A.) | |
| $L_{10}$ | 31.0225 (WA) | −19.6256(WA) | .5518 | 1.620/63.5 |
| | 19.4363 (NA) | −4.6536(NA) | | |
| | | | 6.8501−5.7681* | |
| | APERTURE STOP (N.A. ONLY) | | | |
| | | | 0.0000 (W.A.) | |
| | | | 15.9712 (N.A.) | |
| $L_{11}$ | INF | INF | 17.6000 | 1.517/64.2 |
| | | | 2.6000 | |
| $L_{12}$ | 12.5564 | −5.7128 | .6383 | 1.620/63.5 |
| | | | .1305 | |
| $L_{13}$ | −5.3975 | 636.0106 | .3203 | 1.613/44.3 |
| | | | 12.3913 | |
| | APERTURE STOP (W.A. ONLY) | | | |
| | | | 5.2425 | |
| $L_{14}$ | 4.9701 | 1.9843 | .1500 | 1.648/33.9 |
| $L_{15}$ | 1.9843 | 102.0188 | .3203 | 1.517/64.2 |
| | | | .4500 | |
| $L_{16}$ | INF | INF | 1.500 | |
| | | | 1.000 | |

| ASPHERIC CONSTANTS | | IMAGE | |
|---|---|---|---|

$$Z = \frac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$$

| ASPHERIC | CURVE | K | A | B |
|---|---|---|---|---|
| A(1) | .45941698 | 0.000000 | .0300514 | −.00289859 |
| | C | D | | |

*Focussing Motion for object distances from infinity to 3 inches.

It should be realized that both the television background lens system in FIG. 5 and the movie background lens system in FIG. 6 could also be advantageously used as a single lens system, for example in the environment of simulators and optical scanning probes. Both of these lens systems provide an advantageous fixed entrance pupil with a minimum altitude and permit a variance from a wide angle to telephoto mode of operation by simply throwing a switch. When used in a composite photography system with a complimentary foreground optical system they provide additional advantages that are unique in composite photography.

Referring to FIG. 7, a schematic of a narrow angle movie foreground camera lens system of F/2.8 is disclosed. The lens system comprises nine lens elements with a resulting metric match provided by the foreground lens systems to the narrow angle mode of the movie background lens system of better than one part in 3000 from a near object distance of 30 inches to infinity. This lens provides an illumination uniformity versus field of view of less than ±10%; a maximum distortion of a ±1.6% and a transverse entrance pupil aberration of less than ±0.003 inches.

The first lens group is stationary and forms a nearly afocal lens unit. The elements of the lens system, from left to right are a negative meniscus lens 214, a double concave lens 216, a positive meniscus lens 218, a doublet convex lens 220, a negative meniscus lens 222, an aperture stop 224, a negative meniscus lens 226, a doublet 228, a double convex lens 230, a negative meniscus lens 232, and finally a beam splitter 234. The lenses, as positioned in FIG. 7, are disclosed in a close object position wherein the focus is set at 30 inches.

Figure 19:
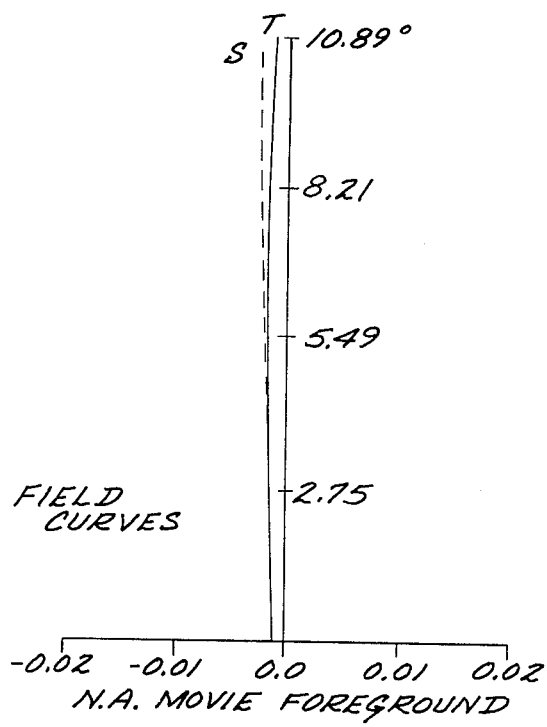
Figure 20:
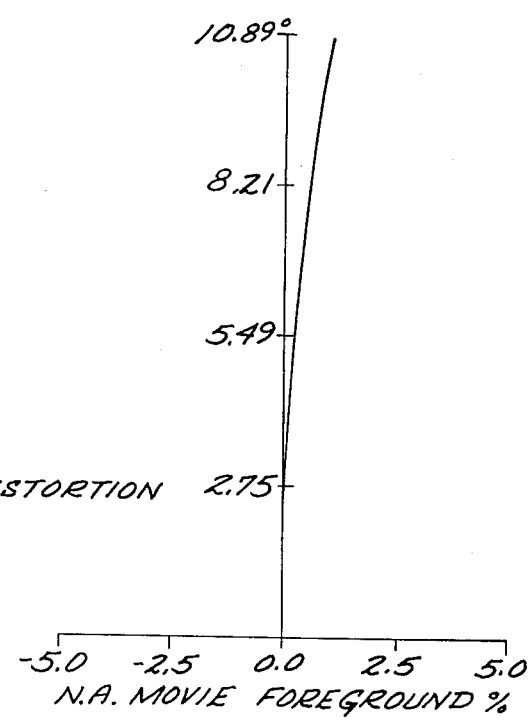

The parameters of this lens design are disclosed in the following Table 5 and the astigmatism and distortion are plotted respectively in FIGS. 19 and 20. The effective focal length is 3.165 and the field is ±10.89°.

TABLE 5

| | MOVIE FOREGROUND N.A. | | | |
|---|---|---|---|---|
| ELEMENT | $R_1$ | $R_2$ | T | N/V |
| $L_1$ | 12.4688 | 2.9120 | .4500 | 1.603/60.6 |
| | | | .5552 | |
| $L_2$ | −4.5092 | 7.0685 | .3000 | 1.673/32.2 |
| | | | .4044 | |
| $L_3$ | −10.7271 | −4.3698 | .0500 | 1.750/35.0 |
| | | | .0300 | |
| $L_4$ | 5.0559 | −5.1674 | .0699 | 1.658/50.9 |
| | | | .7719 | |
| $L_5$ | 2.3470 | 1.8769 | .0300 | 1.487/70.4 |
| | | | 3.9626 | |
| | APERTURE STOP | | | |
| | | | .3329−2578* | |
| $L_6$ | 17.0981 | 2.7320 | .2000 | 1.785/26.1 |
| | | | .1976 | |
| $L_7$ | 11.2713 | −1.4236 | .4530 | 1.596/39.2 |
| $L_8$ | −1.4236 | −3.8002 | .8000 | 1.762/27.0 |
| | | | .0300 | |
| $L_9$ | 4.0857 | −3.0846 | .0300 | 1.658/50.9 |

TABLE 5-continued

| | MOVIE FOREGROUND N.A. | | | |
|---------|--------|--------|-----------------|------------|
| ELEMENT | $R_1$ | $R_2$ | T | N/V |
| $L_{10}$ | 3.0368 | 1.9587 | .0306–7573*<br>.0402 | 1.487/70.4 |

*Focussing motion for object distance from infinity to 30 inches.

FIG. 8 discloses a schematic of a foreground movie camera lens system for wide angle and an F. No. of F/2.8. The total field of view comprises a horizontal of approximately 50 degrees and a diagonal of 60 degrees. The illumination uniformity versus the field of view is less than ±10%. The distortion is no greater than a −2% with a distortion variation during focussing of not less than one part in 3000. The transverse entrance pupil aberration is less than a ±0.005.

The lens elements from left to right are as follows, three meniscus lenses, 236, 238 and 240, a doublet 242, a double convex lens 244, a negative meniscus lens 246, an aperture stop 248, a negative meniscus lens 250, a triplet lens 252, a double convex lens 254 and a beam splitter 256.

Figure 17:
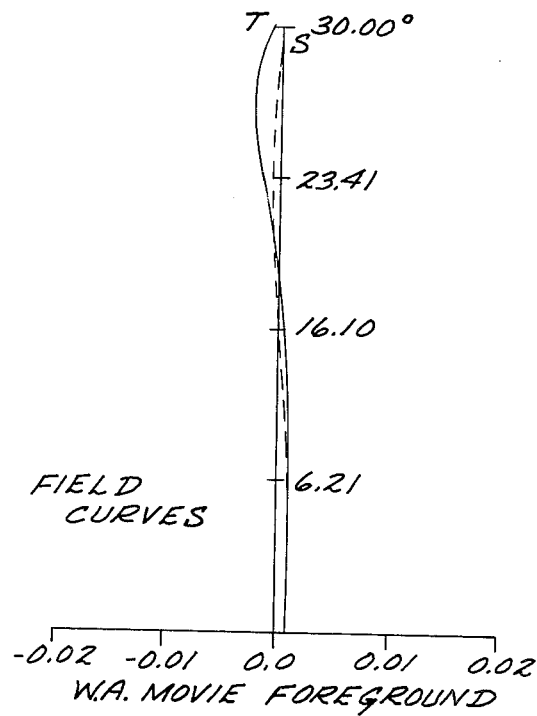
Figure 18:
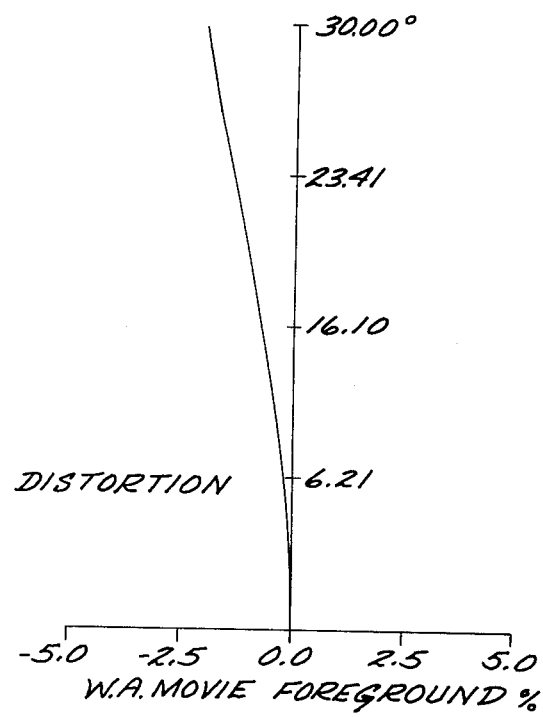

The astigmatism for the wide angle movie foreground system is disclosed in FIG. 17, while the distortion is disclosed in FIG. 18. The parameters of this lens design are set forth in the following Table 6 wherein the effective focal length is 1.06 and the field is ±30°.

TABLE 6

| | MOVIE FOREGROUND W.A. | | | |
|---------|---------|---------|-------------------|------------|
| ELEMENT | $R_1$ | $R_2$ | T | N/V |
| $L_1$ | 21.4461 | 2.7274 | .6500<br>.7609 | 1.548/45.8 |
| $L_2$ | 7.1074 | 2.7086 | .3500<br>.3016 | 1.734/51.7 |
| $L_3$ | 12.6902 | 3.3383 | .3500<br>.9032 | 1.734/51.7 |
| $L_4$ | −6.4653 | 2.3432 | .2657 | 1.717/29.5 |
| $L_5$ | 2.3432 | −3.7542 | 1.3140<br>.2832 | 1.691/54.8 |
| $L_6$ | 4.6005 | −5.9661 | .8030<br>.0200 | 1.689/30.6 |
| $L_7$ | 1.9606 | 1.3756 | .3000<br>3.0626 | 1.487/40.4 |
| APERTURE STOP | | | | |
| $L_8$ | 3.6598 | 1.3909 | .3330–2657*<br>.1594<br>.1033 | 1.653/39.7 |
| $L_9$ | 15.3539 | −.7371 | .2873 | 1.487/70.4 |
| $L_{10}$ | −.7371 | 1.4814 | .1594 | 1.653/39.7 |
| $L_{11}$ | 1.4814 | −1.7368 | .5000<br>.1404–.1699* | 1.691/54.8 |
| $L_{12}$ | 5.9981 | −2.3572 | .4550<br>.1448–.1826* | 1.620/63.5 |
| $L_{13}$ | INF | INF | 1.5000<br>1.0000 | 1.517/64.2 |

*Focussing motion for object distance from infinity to 27 inches.

In summary, the present invention provides complimentary dual optical systems for a foreground and background scene that provide respective images which can be combined to produce a synthesized realistic composite image. The problems that have existed in the past, relating to magnification variation of an image in one system during focussing have been eliminated. A substantially constant magnification ratio of image to object during a variable focussing of either the foreground or the background optical systems is provided. Additionally, the aberrations that have existed such as those associated with the displacement of the entrance pupil with field and shift of the entrance pupil with focus have been eliminated such that panning and focussing during filming are now practical without impacting image registration.

An entirely new degree of freedom is now provided the photography and television field to fully realize the economics in real life simulation that can be accomplished with a miniature background. In addition, the background lens systems proposed here also permits in the simulator field a minimum altitude and constant image magnification during focussing. These advantages and improvements of the present invention are capable of further modifications within the scope of the present invention once artisans skilled in this field are aware of the generic principles of the present invention.

Accordingly, the scope of the present invention should be measured solely from the following claims wherein I claim:

1. In a composite photography system of the registered matte type having foreground and background camera optical systems and objects constituting a reference frame for each camera optical system in a scene in the field of view of each camera, the size of the objects in the background scene being on a scale different from that of objects in the foreground scene and means for coordinating the movement of each camera optical system, the improvement comprising;
   a substantially stationary entrance pupil position being maintained in respectively the foreground and background optical systems during a focusing mode of operation, and
   means for maintaining a substantially constant magnification ratio of image to object during a variable focussing of at least one of the foreground and background optical systems whereby the composite registration scale of the foreground and background objects are maintained.

2. The invention of claim 1 further including means for preventing any substantial differential movement of the respective entrance pupils as a function of field angle from the center of the field of view to the corner.

3. The invention of claim 2 wherein the means for preventing movement result from the optical design of the lens system elements.

4. The invention of claim 1 further including means for focusing the background camera optical system with negligible changes in chromatic aberration and negligible changes in monochromatic aberrations such as spherical aberration being introduced into the optical system.

5. The invention of claim 1 wherein the foreground optical system includes a stop member and a focussing lens group movable in the image space of the stop member.

6. The invention of claim 1 wherein the background optical system includes a telecentric objective lens group.

7. The invention of claim 6 wherein the background optical system further includes a stop member and a focussing lens group movable in the space between the telecentric objective and the stop member, the telecentric objective lens group remains stationary during focussing with respect to the object and the focal plane.

8. The invention of claim 1 further including optical rotating means to control rotation of the background image.

9. The invention of claim 1 wherein the background optical system includes a pair of alternative lens groups for selective inclusion in the optical system, a first lens group providing a relatively wide field of view when inserted in the optical system and a second lens group providing a relatively narrower field of view when it is substituted for the first lens group in the optical system.

10. The invention of claim 9 wherein the entrance pupil position remains at approximately the same position with either the first lens group and the second lens group.

11. The invention of claim 9 wherein each alternative lens group is a doublet.

12. The invention of claim 1 wherein the magnification ratio and focal length of the lens systems vary less than one part in 750 during focussing.

13. The invention of claim 1 further including an aspherical field lens in the background optical system to control spherical aberration of the pupil.

14. The invention of claim 1 wherein the background camera optical system includes a plurality of lens elements and has an external stationary entrance pupil in the object space before the first lens element.

15. The invention of claim 14 wherein a scan mirror is provided in the background camera optical system to reflect object images into the optical system, the scan mirror is positioned substantially at the spatial position of the external stationary entrance pupil.

16. The invention of claim 1 wherein the magnification ratio and focal length of the lens systems vary less than one part in 3000 during focussing.

17. In a composite photography system of the registered matte type having foreground and background camera optical systems and objects constituting a reference frame for each camera optical system in a scene in the field of view of each camera, means for coordinating the movement of each camera optical system and means for combining selected portions of the background and foreground scenes into a composite output image, the improvement comprising;
means for providing a substantially stationary entrance pupil position in both the background and foreground optical systems during a variable focussing mode of operation of at least one of the foreground and background optical systems.

18. The invention of claim 17 further including means for preventing any substantial differential movement of the respective entrance pupils during any change in the field angle from the center of the field of view to the corner.

19. The invention of claim 17 further including means for focussing the background camera optical system with negligible changes in chromatic aberration and negligible changes in monochromatic aberrations such as spherical aberration being introduced into the optical system.

20. The invention of claim 17 wherein the foreground camera optical lens system comprises the following design parameters;

| ELEMENT | $R_1$ | $R_2$ | T | N/V |
|---|---|---|---|---|
| $L_1$ | 243.7806 | 7.7411 | .3000 | 1.487/70.4 |
|  |  |  | .5239 |  |
| $L_2$ | −2.0702 | 40.1118 | .2300 | 1.785/26.1 |
|  |  |  | .3438 |  |
| $L_3$ | −6.3980 | −2.1841 | .4933 | 1.750/35.0 |
|  |  |  | .0200 |  |
| $L_4$ | 2.5033 | 27.2883 | .6200 | 1.682/48.2 |
|  |  |  | .8520 | 1.517/64.2 |
| $L_5$ | 2.1219 | .9908 | .4200 |  |
|  |  |  | 2.5308 |  |
| APERTURE STOP | | | | |
|  |  |  | 1.2888−1.1050* |  |
| $L_6$ | 5.6598 | 1.9319 | .3250 | 1.755/27.6 |
|  |  |  | .1978 |  |
| $L_7$ | −10.6363 | −.9291 | .3919 | 1.517/52.2 |
| $L_8$ | −.9291 | −1.7537 | .1500 | 1.699/30.1 |
|  |  |  | .0200−.0430* |  |
| $L_9$ | 3.9300 | −2.1984 | .3500 | 1.613/57.4 |
|  |  |  | .9526−1.1125* |  |
| $L_{10}$ | INF | INF | 2.590 | 1.517/64.2 | wherein $R_1$ is the object side radius of curvature, $R_2$ is the image side radius of curvature, T is the axial spacings, N is the index of refraction, V is the Abbe number and * is the focusing motion for object distance from infinity to 25 inches.

21. The invention of claim 17 wherein the foreground camera optical lens system comprises the following design parameters;

| ELEMENT | $R_1$ | $R_2$ | T | N/V |
|---|---|---|---|---|
| $L_1$ | 7.1881 | 1.7284 | .3000 | 1.613/57.4 |
|  |  |  | .5172 |  |
| $L_2$ | −69.6418 | 2.2998 | .1800 | 1.613/57.4 |
|  |  |  | .4688 |  |
| $L_3$ | −4.9464 | 4.1043 | .1800 | 1.613/57.4 |
|  |  |  | .2847 |  |
| $L_4$ | 4.8318 | 2.0249 | .1800 | 1.755/27.6 |
| $L_5$ | 2.0249 | −3.2428 | 1.2791 | 1.702/41.0 |
|  |  |  | .0250 |  |
| $L_6$ | 2.7201 | −10.6614 | .7156 | 1.639/55.4 |
|  |  |  | .3827 |  |
| $L_7$ | 3.7041 | 1.1792 | .2400 | 1.678/55.2 |
|  |  |  | 3.1259 |  |
| APERTURE STOP | | | | |
|  |  |  | 1.2303−1.2114* |  |
| $L_8$ | 3.0262 | 1.7214 | .1500 | 1.755/27.6 |
|  |  |  | .1610 |  |
| $L_9$ | 5.7825 | −1.0570 | .4878 | 1.532/48.8 |
| $L_{10}$ | −1.0570 | −2.0138 | .1500 | 1.755/27.6 |
|  |  |  | .0250 |  |
| $L_{11}$ | 2.6075 | −2.4395 | .4000 | 1.518/65.1 |
|  |  |  | .5200−.5389* |  |
| $L_{12}$ | ∞ | ∞ | 2.597 | 1.517/64.2 | wherein $R_1$ is the object side radius of curvature, $R_2$ is the image side radius of curvature, T is the axial spacings, N is the index of refraction, V is the Abbe number and * is the focusing motion for object distance from infinity to 27.3 inches.

22. The invention of claim 17 wherein the background camera optical lens system comprises the following design parameters;

| ELEMENT | $R_1$ | $R_2$ | T | N/V |
|---|---|---|---|---|
| ENTRANCE PUPIL | | | | |
|  |  |  | .600 |  |
| $L_1$ | −.3831 | −.5001 | .1800 | 1.689/31.2 |
| $L_2$ | −.5001 | −.6377 | .2778 | 1.682/48.2 |
|  |  |  | .0200 |  |
| $L_3$ | 9.2843 | −1.6608 | .2991 | 1.682/48.2 |

-continued

| | | | | |
|---|---|---|---|---|
| | | | .9704 | |
| $L_4$ | 20.0454 | −1.2503 | .4130 | 1.682/48.2 |
| $L_5$ | −1.2503 | −58.4298 | .1496 | 1.785/25.8 |
| | | | .1908 | |
| $L_6$ | 1.8554 | A(1) | .2812 | 1.623/56.9 |
| | | | 1.5507-2.2492* | |
| | | | .0100 | |
| $L_7$ | −1.1587 | −1.3603 | .4497 | 1.620/63.5 |
| | | | 9.4116 (N.A.) | |
| | | | 33.1327 (W.A.) | |
| $L_8$ | −65.5888(WA) | 114.8079(WA) | .2500 | 1.717/29.5 |
| | −27.1614(NA) | 9.7697(NA) | | |
| | | | .2500 (N.A.) | |
| | | | .2875 (W.A.) | |
| $L_9$ | 41.6919(WA) | −20.4917(WA) | .3750 (W.A.) | 1.620/63.5 |
| | 16.3449(NA) | −4.4304(NA) | | |
| | | | 5.2465-4.5480* | |
| APERTURE STOP (W.A. ONLY) | | | | |
| | | | 0.0 (W.A.) | |
| | | | 15.0077 (N.A.) | |
| $L_{10}$ | INF | INF | 12.6360 | 1.517/64.2 |
| | | | 13.2643 | |
| $L_{11}$ | 12.9564 | −6.9700 | .4564 | 1.620/63.5 |
| | | | .0639 | |
| $L_{12}$ | −6.7227 | 121.1455 | .2500 | 1.613/44.3 |
| | | | 11.3847 | |
| APERTURE STOP (N.A. ONLY) | | | | |
| | | | 5.3327 | |
| $L_{13}$ | 5.1092 | 1.9027 | .1200 | 1.648/33.9 |
| $L_{14}$ | 1.9027 | −35.4037 | .3200 | 1.517/64.2 |
| | | | 2.500 | |
| $L_{15}$ | INF | INF | 2.597 | 1.517/64.2 |

ASPHERIC CONSTANTS $$Z = \frac{(CURV)Y^2}{1 + (1 - (1 + K) CURV)^2 Y^2)^{\frac{1}{2}}} + (A)Y^4 + (B)Y^6 + (C)Y^8 + (D)Y^{10}$$

| ASPHERIC | CURV | K | A | B |
|---|---|---|---|---|
| A(1) | .11292133 | 0.000000 | .0666574 | −.0641578 |
| C | D | | | |
| .103504 | −.061565 | | | | wherein $R_1$ is the object side radius of curvature, $R_2$ is the image side radius of curvature, T is the axial spacings, N is the index of refraction, V is the Abbe number, * is the focusing motion for object distance from infinity to 3 inches, (NA) is a removable narrow angle lens element, and (WA) is a wide angle lens element.

23. The invention of claim 17 wherein the background camera optical lens system comprises the following design parameters;

| ELEMENT | $R_1$ | $R_2$ | T | N/V |
|---|---|---|---|---|
| ENTRANCE PUPIL | | | | |
| | | | .4100 | |
| $L_1$ | −.5333 | −2.7433 | .2306 | 1.755/27.6 |
| $L_2$ | −2.7433 | −.9113 | .3613 | 1.682/48.2 |
| | | | .0194 | |
| $L_3$ | −13.5624 | −1.5431 | .3833 | 1.682/48.2 |
| $L_4$ | 5.5455 | −1.7100 | .6000 | 1.682/48.2 |
| $L_5$ | −1.7100 | −81.2716 | .1916 | 1.785.25.8 |
| | | | .0321 | |
| $L_6$ | 2.1318 | −175.3409 | .4806 | 1.744/44.8 |
| | | | .0180 | |
| $L_7$ | 522.5875 | A(1) | .1916 | 1.620/63.5 |
| | | | .8225-1.9045* | |
| $L_8$ | −1.2290 | −1.4284 | .3861 | 1.658/50.9 |
| | | | 32.5192 (W.A.) | |
| | | | 10.0380 (N.A.) | |
| $L_9$ | −52.3494 (WA) | 76.8036(WA) | .3203 | 1.717/29.5 |
| | −47.9893 (NA) | 10.9762(NA) | | |
| | | | .2500 (W.A.) | |
| | | | .0800 (N.A.) | |
| $L_{10}$ | 31.0225 (WA) | −19.6256(WA) | .5518 | 1.620/63.5 |
| | 19.4363 (NA) | −4.6536(NA) | | |
| | | | 6.8501-5.7681* | |
| APERTURE STOP (N.A. ONLY) | | | | |
| | | | 0.0000 (W.A.) | |
| | | | 15.9712 (N.A.) | |
| $L_{11}$ | INF | INF | 17.6000 | 1.517/64.2 |
| | | | 2.6000 | |
| $L_{12}$ | 12.5564 | −5.7128 | .6383 | 1.620/63.5 |

-continued

| | | | .1305 | |
|---|---|---|---|---|
| $L_{13}$ | −5.3975 | 636.0106 | .3203 | 1.613/44.3 |
| | | | 12.3913 | |
| | | APERTURE STOP (W.A. ONLY) | | |
| | | | 5.2425 | |
| $L_{14}$ | 4.9701 | 1.9843 | .1500 | 1.648/33.9 |
| $L_{15}$ | 1.9843 | 102.0188 | .3203 | 1.517/64.2 |
| | | | .4500 | |
| $L_{16}$ | INF | INF | 1.500 | |
| | | | 1.000 | |

| ASPHERIC CONSTANTS | | IMAGE | | |
|---|---|---|---|---|
| $Z = \dfrac{(CURV)Y^2}{1 + (1 - (1 + K)(CURV)^2 Y^2)^{\frac{1}{2}}} + (A)Y^4 + (B)Y^6 + (C)Y^8 + (D)Y^{10}$ | | | | |
| ASPHERIC | CURVE | K | A | B |
| A(1) | .45941698 | 0.000000 | .0300514 | −.00289859 |
| C | D | | | |
| .00441495 | .000174108 | | | | wherein $R_1$ is the object side radius of curvature, $R_2$ is the image side radius of curvature, T is the axial spacings, N is the index of refraction, V is the abbe number, * is the focussing motion for object distance from infinity to 3 inches, (NA) is a removable narrow angle line element and (WA) is a wide angle lens element.

24. The invention of claim 17 wherein the foreground camera optical lens system comprises the following design parameters;

| ELEMENTS | $R_1$ | $R_2$ | T | N/V |
|---|---|---|---|---|
| $L_1$ | 12.4688 | 2.9120 | .4500 | 1.603/60.6 |
| | | | .5552 | |
| $L_2$ | −4.5092 | 7.0685 | .3000 | 1.673/32.2 |
| | | | .4044 | |
| $L_3$ | −10.7271 | −4.3698 | .0500 | 1.750/35.0 |
| | | | .0300 | |
| $L_4$ | 5.0559 | −5.1674 | .0699 | 1.658/50.9 |
| | | | .7719 | |
| $L_5$ | 2.3470 | 1.8769 | .0300 | 1.487/70.4 |
| | | | 3.9626 | |
| | | APERTURE STOP | | |
| | | | .3329-2578* | |
| $L_6$ | 17.0981 | 2.7320 | .2000 | 1.785/26.1 |
| | | | .1976 | |
| $L_7$ | 11.2713 | −1.4236 | .4530 | 1.596/39.2 |
| $L_8$ | −1.4236 | −3.8002 | .8000 | 1.762/27.0 |
| | | | .0300 | |
| $L_9$ | 4.0857 | −3.0846 | .0300 | 1.658/50.9 |
| | | | .0306-7573* | |
| $L_{10}$ | 3.0368 | 1.9587 | .0402 | 1.487/70.4 | wherein $R_1$ is the object side radius of curvature, $R_2$ is the image side radius of curvature, T is the axial spacings, N is the index of refraction, V is the Abbe number and * is the focussing motion for object distance from infinity to 30 inches.

25. The invention of claim 17 wherein the foreground camera optical lens system comprises the following design parameters;

| ELEMENT | $R_1$ | $R_2$ | T | N/V |
|---|---|---|---|---|
| $L_1$ | 21.4461 | 2.7274 | .6500 | 1.548/45.8 |
| | | | .7609 | |
| $L_2$ | 7.1074 | 2.7086 | .3500 | 1.734/51.7 |
| | | | .3016 | |
| $L_3$ | 12.6902 | 3.3383 | .3500 | 1.734/51.7 |
| | | | .9032 | |
| $L_4$ | −6.4653 | 2.3432 | .2657 | 1.717/29.5 |
| $L_5$ | 2.3432 | −3.7542 | 1.3140 | 1.691/54.8 |
| | | | .2832 | |
| $L_6$ | 4.6005 | −5.9661 | .8030 | 1.689/30.6 |
| | | | .0200 | |

-continued

| ELEMENT | $R_1$ | $R_2$ | T | N/V |
|---|---|---|---|---|
| $L_7$ | 1.9606 | 1.3756 | .3000 | 1.487/70.4 |
| | | | 3.0626 | |
| | | APERTURE STOP | | |
| | | | .3330-.2657* | |
| $L_8$ | 3.6598 | 1.3909 | .1594 | 1.653/39.7 |
| | | | .1033 | |
| $L_9$ | 15.3539 | −.7371 | .2873 | 1.487/70.4 |
| $L_{10}$ | −.7371 | 1.4814 | .1594 | 1.653/39.7 |
| $L_{11}$ | 1.4814 | −1.7368 | .5000 | 1.691/54.8 |
| | | | .1404-.1699* | |
| $L_{12}$ | 5.9981 | −2.3572 | .4550 | 1.620/63.5 |
| | | | .1448-.1826* | |
| $L_{13}$ | INF | INF | 1.5000 | 1.517/64.2 |
| | | | 1.0000 | | wherein $R_1$ is the object side radius of curvature, $R_2$ is the image side radius of curvature, T is the axial spacings, N is the index of refraction, V is the Abbe number and * is the focusing motion for object distance from infinity to 27 inches.

26. The invention of claim 17 wherein the background optical system includes a telecentric objective lens group.

27. The invention of claim 26 wherein the background optical system further includes a stop member and a focussing lens group movable in the space between the telecentric objective and the stop member, the telecentric objective lens group remains stationary during focussing with respect to the object and the focal plane.

28. The invention of claim 17 wherein the foreground optical system includes a stop member and a focussing lens group movable in the image space of the stop member.

29. The invention of claim 17 further including optical rotating means to control rotation of the background image.

30. The invention of claim 29 wherein the optical rotating means includes a dove prism.

31. The invention of claim 17 wherein the background optical system includes a pair of alternative lens groups for selective inclusion in the optical system, a first lens group providing a relatively wide field of view when inserted in the optical system and a second lens group providing a relatively narrower field of view when it is substituted for the first lens group in the optical system.

32. The invention of claim 31 wherein the entrance pupil position remains at approximately the same position with either the first lens group and the second lens group.

33. The invention of claim 17 wherein each alternative lens group is a doublet.

34. The invention of claim 17 wherein the magnification ratio and focal length of the lens systems vary less than one part in 750 during focussing.

35. The invention of claim 17 further including an aspherical field lens in the background optical system to control spherical aberration of the pupil.

36. The invention of claim 17 wherein the background camera optical system includes a plurality of lens elements and has an external stationary entrance pupil in the object space before the first lens element.

37. The invention of claim 36 wherein a scan mirror is provided in the background camera optical system to reflect object images into the optical system, the scan mirror is positioned substantially at the spatial position of the external stationary entrance pupil.

38. The invention of claim 17 wherein the magnification ratio and focal length of the lens system vary less than one part in 3000 during focussing.

39. A coordinated dual optical system of an effective predetermined field angle capable of providing a composite image while permitting different focal lengths to be used in each optical system comprising;
 a first optical system having a plurality of lens elements and a first entrance pupil;
 a second optical system having a plurality of lens elements and a second entrance pupil;
 means for focussing the respective optical systems, including means for focussing the background camera optical system with negligible changes in chromatic aberration and negligible changes in monochromatic aberrations such as spherical aberration being introduced into the optical system;
 means for coordinating the movement of each optical system, and
 means for maintaining a substantially constant magnification ratio of image to object during a variable focussing of at least one of the optical systems.

40. The invention of claim 39 further including means for providing a substantially stationary entrance pupil position in both the first and second optical systems during a focussing mode of operation in either of the optical systems.

41. The invention of claim 40 further including means for preventing any substantial differential movement of the respective entrance pupils as a function of field angle from the center of the field of view to the corner.

42. The invention of claim 41 wherein the means for preventing movement results from the optical design of the lens system elements.

43. The invention of claim 40 wherein the second optical system includes a telecentric objective lens group.

44. The invention of claim 43 wherein the second optical system further includes a focussing lens group movable between the telecentric objective lens group and the stop member, the telecentric objective lens group remains stationary during focussing with respect to the object and the focal plane.

45. The invention of claim 43 wherein the first optical system includes a stop member and a focussing lens group movable between the telecentric objective lens group and the stop member.

46. The invention of claim 40 further including optical rotating means to control rotation of the transmitted image in one of the optical systems.

47. The invention of claim 46 wherein the optical rotating means includes a prism.

48. The invention of claim 40 wherein the second optical system includes a pair of alternative lens groups for selective inclusion in the optical system, a first lens group providing a relatively wide field of view when inserted in the optical system and a second lens group providing a relatively narrower field of view when it is substituted for the first lens group in the optical system.

49. The invention of claim 48 wherein the entrance pupil position remains at approximately the same position with the first lens group and the second lens group.

50. The invention of claim 40 wherein each alternative lens group is a doublet.

51. The invention of claim 40 further including an aspherical field lens in the second optical system to control spherical aberration of the pupil.

52. The invention of claim 40 wherein the second optical system includes an external stationary entrance pupil in the object space before the first lens element.

53. The invention of claim 52 wherein a scan mirror is provided in the second optical system to reflect object images into the second optical system, the scan mirror is positioned substantially at the spatial position of the external stationary entrance pupil.

54. The invention of claim 40 wherein the magnification ratio and focal length of the lens system vary less than one part in 3000 during focussing.

* * * * *

UNITED STATES PATENT AND TRADEMARK OFFICE
CERTIFICATE OF CORRECTION

PATENT NO. : 4,249,805

DATED : February 10, 1981

INVENTOR(S) : Robert S. Hilbert, Thomas I. Harris, Darryl E. Gustafson, Matthew P. Rimmer It is certified that error appears in the above—identified patent and that said Letters Patent is hereby corrected as shown below:

Column 13, Table 3, after "APERTURE STOP (W.A." delete ")".

Column 15, Table 4, bottom line, below " C ", insert --.00441495--; below " D ", insert --.000174108--.

Column 15, line 62, delete "±1.6%" and insert --+1.6%--.

Column 17, line 42, delete "1.487/40.4" and insert --1.487/70.4--.

Claim 22, Column 21, under ASPHERIC CONSTANTS, after "(1 + K)", and before "CURV", insert --(--.

Signed and Sealed this

Twenty-first Day of July 1981

[SEAL]

Attest:

GERALD J. MOSSINGHOFF

Attesting Officer

Commissioner of Patents and Trademarks